US012711864B2

(12) United States Patent

Liu et al.

(10) Patent No.: US 12,711,864 B2
(45) Date of Patent: Aug. 18, 2026

(54) METHOD AND APPARATUS FOR PROCESSING PARKING SPACE INFORMATION

(71) Applicant: Yinwang Intelligent Technologies Co., Ltd., Shenzhen (CN)

(72) Inventors: Yalin Liu, Shanghai (CN); Wei Zhou, Shanghai (CN); Hongpu Xia, Shanghai (CN); Deyuan Wang, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 107 days.

(21) Appl. No.: 18/651,916

(22) Filed: May 1, 2024

(65) Prior Publication Data

US 2024/0282195 A1 Aug. 22, 2024

Related U.S. Application Data

(63) Continuation of application No. PCT/CN2022/105772, filed on Jul. 14, 2022.

(30) Foreign Application Priority Data

Nov. 1, 2021 (CN) .......................... 202111282911.4

(51) Int. Cl.
*G08G 1/14* (2006.01)

(52) U.S. Cl.
CPC .................................... *G08G 1/143* (2013.01)

(58) Field of Classification Search
CPC ........ G08G 1/143; G08G 1/144; G08G 1/146; G08G 1/147; G08G 1/14; B62D 15/027
USPC .......................................................... 701/300
See application file for complete search history.

(56) References Cited

U.S. PATENT DOCUMENTS

| | | | | |
|---|---|---|---|---|
| 11,307,580 B2 * | 4/2022 | Gibbs | G05D 1/0278 |
| 2017/0154530 A1 * | 6/2017 | Irion | G08G 1/09623 |
| 2017/0355307 A1 * | 12/2017 | Ha | B60Q 9/005 |
| 2018/0335777 A1 | 11/2018 | Gibbs et al. | |
| 2020/0143306 A1 * | 5/2020 | Gao | G06Q 10/047 |
| 2020/0273336 A1 * | 8/2020 | Gruteser | G08G 1/01 |
| 2021/0074158 A1 * | 3/2021 | Gruteser | G06V 20/586 |

(Continued)

FOREIGN PATENT DOCUMENTS

| | | | |
|---|---|---|---|
| CN | 107776571 A | 3/2018 | |
| CN | 109466545 A | 3/2019 | |
| CN | 110895888 A * | 3/2020 | H04W 4/06 |

(Continued)

OTHER PUBLICATIONS

CN109087522; Parking lot vacant parking space detection method and device; Zongmu Tech Shanghai Co Ltd. (Year: 2018).*

(Continued)

*Primary Examiner* — B M M Hannan
(74) *Attorney, Agent, or Firm* — Conley Rose, P.C.

(57) ABSTRACT

A method for processing parking space information includes detecting, before a driver sends information for requesting an effective parking space, whether an idle parking space exists in a traveling environment of a vehicle and recording information about the idle parking space. After the driver sends the information for requesting an effective parking space, stored information about one or more effective parking spaces is then recommended to the driver.

18 Claims, 4 Drawing Sheets

(56) References Cited

U.S. PATENT DOCUMENTS

| | | | | |
|---|---|---|---|---|
| 2022/0222592 A1* | 7/2022 | Peng | ...................... | G06Q 50/40 |
| 2023/0154328 A1* | 5/2023 | Gruteser | ................ | G09G 5/006 |
| | | | | 340/932.2 |

FOREIGN PATENT DOCUMENTS

| | | | | | |
|---|---|---|---|---|---|
| CN | 112185157 | A | | 1/2021 | |
| CN | 108010380 | B | * | 5/2021 | ............. G08G 1/143 |
| CN | 113160607 | A | | 7/2021 | |
| DE | 102007002261 | A1 | | 8/2008 | |
| DE | 102013206208 | A1 | | 10/2014 | |
| JP | 2009211253 | A | | 9/2009 | |
| JP | 2009276927 | A | | 11/2009 | |
| JP | 2020147229 | A | | 9/2020 | |
| JP | 2020201267 | A | | 12/2020 | |
| WO | 2012143033 | A1 | | 10/2012 | |
| WO | 2018037780 | A1 | | 3/2018 | |

OTHER PUBLICATIONS

CN110466508.translate; Parking control method and device, storage medium and control terminal; Guangzhou Xpeng Automobile Tech Co Ltd. (Year: 2019).*

CN111354214.translate; Auxiliary parking method and system; Alibaba Group Holding Ltd. (Year: 2020).*

CN110466508B.translate; Parking control method and device, storage medium and control terminal; Guangzhou Xpeng Automobile Tech Co Ltd. (Year: 2021).*

CN108010380A; Roadside parking space management and parking intelligent cooperation system and method thereof . (Year: 2018).*

CN110895888; Intelligent parking method, device and system, electronic equipment and computer readable medium; Tencent Tech Shenzhen Co Ltd. (Year: 2020).*

* cited by examiner

METHOD AND APPARATUS FOR PROCESSING PARKING SPACE INFORMATION

CROSS-REFERENCE TO RELATED APPLICATIONS

This is a continuation of International Patent Application No. PCT/CN2022/105772 filed on Jul. 14, 2022, which claims priority to Chinese Patent Application No. 202111282911.4 filed on Nov. 1, 2021. The disclosures of the aforementioned applications are hereby incorporated by reference in their entireties.

TECHNICAL FIELD

This application relates to the field of automobiles, and in particular, to a method and an apparatus for processing parking space information.

BACKGROUND

As a quantity of vehicles increases, pressure on an urban parking supply system mounts. Therefore, it is increasingly difficult to find a parking space quickly and conveniently. A traffic flow caused by parking space finding not only increases a road traffic volume and a risk of traffic congestion, but also aggravates environmental pollution and energy consumption. Therefore, how to quickly detect a parking space and release parking space information to a driver becomes a research hotspot.

At present, there are mainly two common manners of detecting a parking space and releasing parking space information to a driver on the market. In a first implementation, when a vehicle travels at a speed lower than 24 kilometers per hour, the vehicle starts to detect a parking space; and when a parking space is detected, the vehicle provides a prompt of the parking space by using a central control screen or another apparatus, to recommend the parking space to the driver. In a second implementation, a vehicle starts to detect a parking space only after an automatic parking function is enabled on the vehicle, and then a detected parking space is recommended to the driver.

However, in the first implementation, as long as the vehicle detects a parking space when traveling at a speed lower than 24 kilometers per hour, the prompt is provided continuously by using the central control screen or another apparatus. In this case, if the driver does not have a parking requirement, driving experience of the driver is greatly affected, and even a traffic accident is caused. In the second implementation, because the vehicle starts to detect a parking space only after the automatic parking function is enabled on the vehicle, a parking space passed before the parking function is enabled cannot be detected. Consequently, a probability that the driver finds a parking space is reduced.

Therefore, how to quickly and effectively find a parking space and improve driver's experience becomes an urgent technical problem to be resolved.

SUMMARY

This application provides a method and an apparatus for processing parking space information. This can not only improve a probability of effectively finding a parking space, but also improve a driver's experience.

According to a first aspect, this application provides a method for processing parking space information. The method includes: detecting, in a traveling process of a vehicle, whether an idle parking space exists in a traveling environment of the vehicle; in a case in which an idle parking space exists in the traveling environment of the vehicle, adding information about the idle parking space to a first parking space information set, where the first parking space information set is used to record the information about the idle parking space; receiving first information, where the first information is used to request information about an effective parking space, and the effective parking space includes an idle parking space that meets a preset condition; and outputting information about one or more effective parking spaces in response to the first information, where the information about the one or more effective parking spaces includes the information about the idle parking space in the first parking space information set.

According to the method for processing parking space information provided in this embodiment, the idle parking space in the traveling environment of the vehicle is started to be detected and the idle parking space is recorded before a driver sends information for requesting the effective parking space. Therefore, after the driver sends the information for requesting an effective parking space, the information about the idle parking space that is recorded before the driver sends the information for requesting an effective parking space may also be recommended to the driver. This expands a range of searching for an idle parking space and improves a probability of finding an idle parking space. In addition, before the driver sends the information for requesting an effective parking space, the information about the idle parking space is not recommended to the driver in any manner. This avoids affecting driver's experience. In other words, the method for processing parking space information provided in this embodiment can not only improve a probability of effectively finding a parking space, but also improve driver's experience.

With reference to the first aspect, in a possible implementation, the method further includes: receiving second information, where the second information indicates a destination of the vehicle; and correspondingly, the detecting, in a traveling process of a vehicle, whether an idle parking space exists in a traveling environment of the vehicle includes: in the traveling process of the vehicle, after a distance between a location of the vehicle and the destination is less than or equal to a first preset distance, starting to detect whether an idle parking space exists in the traveling environment of the vehicle.

According to the method for processing parking space information provided in this embodiment, an idle parking space is started to be detected only after the distance between the location of the vehicle and the destination is less than or equal to the first preset distance. For example, an idle parking space is started to be detected only after the distance between the location of the vehicle and the destination is less than or equal to 3 kilometers.

It may be understood that an idle parking space is started to be detected only after the distance between the location of the vehicle and the destination is less than or equal to the first preset distance. In other words, an idle parking space is not detected when the distance between the location of the vehicle and the destination is greater than the first preset distance. This reduces energy consumption of the vehicle.

With reference to the first aspect, in a possible implementation, the method further includes: receiving third information, where the third information indicates the first preset distance.

According to the method for processing parking space information provided in this embodiment, the detected information about the idle parking space is an idle parking space that meets the first preset distance that is set by the driver. This avoids detection performed on a redundant idle parking space, so that resource consumption of the vehicle is avoided.

With reference to the first aspect, in a possible implementation, the preset condition includes: a distance from a current location of the vehicle is less than or equal to a second preset distance.

According to the method for processing parking space information provided in this embodiment, the output effective parking space is an idle parking space whose distance from the current location of the vehicle is less than or equal to the second preset distance. For example, the output effective parking space is an idle parking space whose distance from the current location of the vehicle is less than or equal to 3 kilometers.

With reference to the first aspect, in a possible implementation, the method further includes: receiving fourth information, where the fourth information indicates the second preset distance.

In this implementation, the output effective parking space is a parking space that meets the second preset distance that is set by the driver. This avoids outputting a meaningless idle parking space.

With reference to the first aspect, in a possible implementation, the preset condition includes: a time difference between a time at which the idle parking space is detected and a current time is less than or equal to preset duration.

According to the method for processing parking space information provided in this embodiment, the time difference between the time at which the output effective parking space is detected and the current time of the vehicle is less than or equal to the preset duration. For example, the time difference between the time at which the output effective parking space is detected and the current time of the vehicle is less than or equal to 30 minutes.

With reference to the first aspect, in a possible implementation, the method further includes: receiving fifth information, where the fifth information indicates the preset duration.

In this implementation, the output effective parking space is a parking space that meets the preset duration set by the user. This avoids outputting a meaningless idle parking space.

With reference to the first aspect, in a possible implementation, the outputting information about one or more effective parking spaces in response to the first information includes: obtaining a second parking space information set through a network in response to the first information, where the second parking space information set is used to record the information about the idle parking space; obtaining the information about the one or more effective parking spaces from the first parking space information set and the second parking space information set; and outputting the information about the one or more effective parking spaces.

In this implementation, the information about the one or more effective parking spaces is output from two parking space information sets. Therefore, compared with that the information about the one or more effective parking spaces is output through a single parking space information set, the information about the one or more effective parking spaces output in this implementation is more robust.

According to a second aspect, this application provides an apparatus for processing parking space information. The apparatus includes: a detection module configured to detect, in a traveling process of a vehicle, whether an idle parking space exists in a traveling environment of the vehicle; an adding module configured to: in a case in which an idle parking space exists in the traveling environment of the vehicle, add information about the idle parking space to a first parking space information set, where the first parking space information set is used to record the information about the idle parking space; a receiving module configured to receive first information, where the first information is used to request information about an effective parking space, and the effective parking space includes an idle parking space that meets a preset condition; and a response module configured to output information about one or more effective parking spaces in response to the first information, where the information about the one or more effective parking spaces includes the information about the idle parking space in the first parking space information set.

The modules in the second aspect may be implemented by using software and/or hardware modules.

With reference to the second aspect, in a possible implementation, the receiving module is further configured to: receive second information, where the second information indicates a destination of the vehicle; and correspondingly, the detection module is specifically configured to: in the traveling process of the vehicle, after a distance between a location of the vehicle and the destination is less than or equal to a first preset distance, start to detect whether an idle parking space exists in the traveling environment of the vehicle.

With reference to the second aspect, in a possible implementation, the receiving module is further configured to: receive third information, where the third information indicates the first preset distance.

With reference to the second aspect, in a possible implementation, the preset condition includes: a distance from a current location of the vehicle is less than or equal to a second preset distance.

With reference to the second aspect, in a possible implementation, the receiving module is further configured to: receive fourth information, where the fourth information indicates the second preset distance.

With reference to the second aspect, in a possible implementation, the preset condition includes: a time difference between a time at which the idle parking space is detected and a current time is less than or equal to preset duration.

With reference to the second aspect, in a possible implementation, the receiving module is further configured to: receive fifth information, where the fifth information indicates the preset duration.

With reference to the second aspect, in a possible implementation, the response module is specifically configured to: obtain a second parking space information set through a network in response to the first information, where the second parking space information set is used to record the information about the idle parking space; obtain the information about the one or more effective parking spaces from the first parking space information set and the second parking space information set; and output the information about the one or more effective parking spaces.

According to a third aspect, this application provides an apparatus for processing parking space information, including: a memory, a processor, and a transceiver. The memory is configured to store program instructions. The processor is configured to invoke the program instructions in the memory to perform the method according to any one of the first aspect or the possible implementations of the first aspect.

In some implementations, the apparatus may be a chip. In this implementation, optionally, the apparatus may further include a communication interface configured to communicate with another apparatus or device.

According to a fourth aspect, this application provides a vehicle system. The system includes the apparatus according to any one of the second aspect, the third aspect, or the possible implementations of the second aspect or the third aspect.

According to a fifth aspect, this application provides a vehicle. The vehicle includes the apparatus according to any one of the second aspect, the third aspect, or the possible implementations of the second aspect or the third aspect.

According to a sixth aspect, this application provides a computer-readable medium. The computer-readable medium stores program code for computer execution. The program code is used to perform the method according to any one of the first aspect or the possible implementations of the first aspect.

According to a seventh aspect, this application provides a computer program product. The computer program product includes computer program code. When the computer program code is run on a computer, the computer is enabled to implement the method according to any one of the first aspect or the possible implementations of the first aspect.

For technical effects brought by any one of the implementations of the second aspect to the seventh aspect, refer to the technical effects brought by any one of the possible implementations of the first aspect. Details are not described again.

DESCRIPTION OF EMBODIMENTS

As a quantity of vehicles increases, pressure on an urban parking supply system mounts. Therefore, it is increasingly difficult to find a parking space quickly and conveniently. A traffic flow caused by parking space finding not only increases a road traffic volume and a risk of traffic congestion, but also aggravates environmental pollution and energy consumption. Therefore, how to quickly detect a parking space and release parking space information to a driver becomes a research hotspot.

Figure 1:
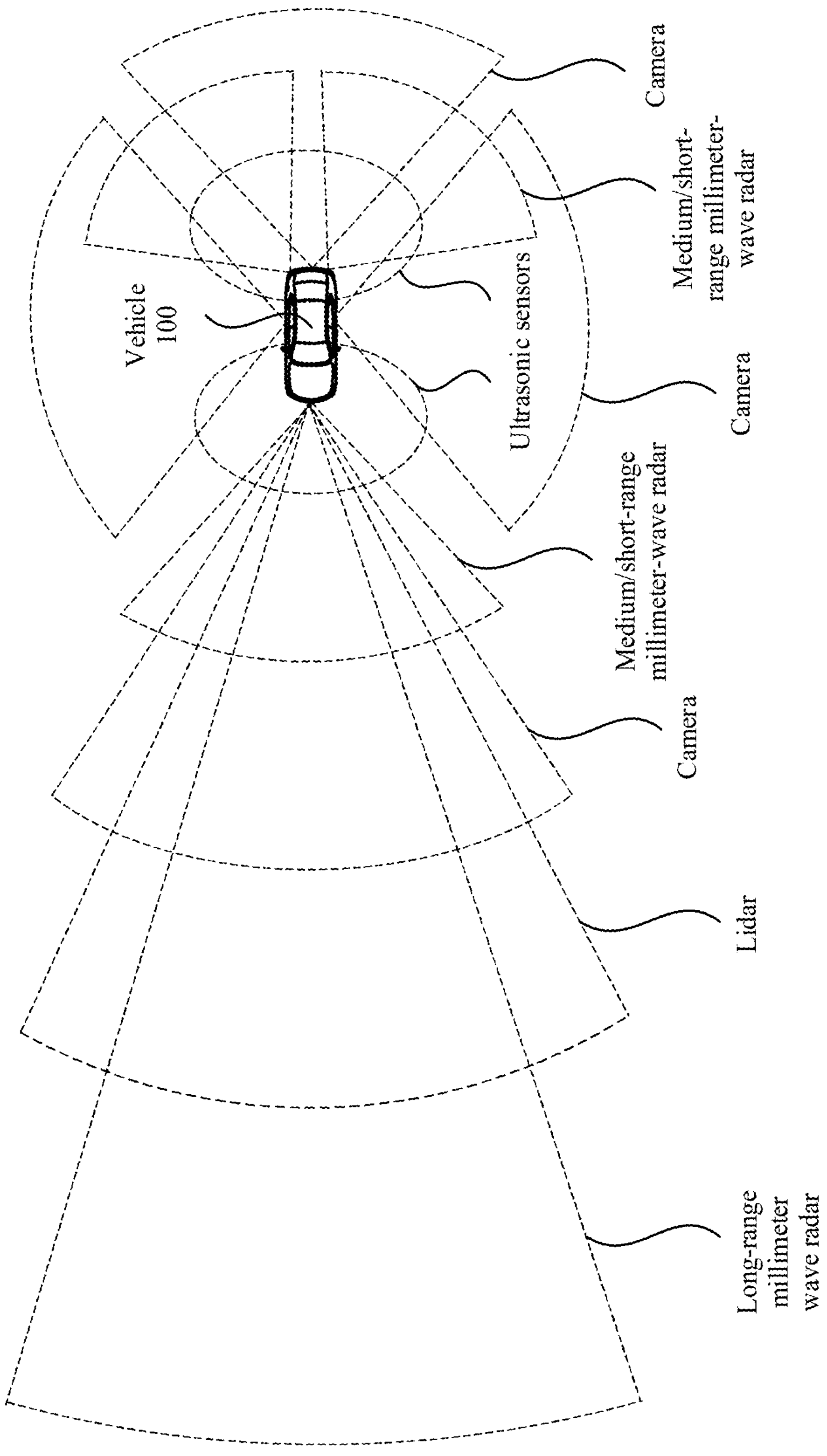
FIG. 1 is a schematic diagram of a structure of a vehicle according to this application.

FIG. 1 is a schematic diagram of a structure of a vehicle according to this application. As shown in FIG. 1, a plurality of types of sensors may be installed on a vehicle 100, to obtain environment information around the vehicle by using the sensors. The obtained information is analyzed and processed to implement functions such as obstacle sensing, target recognition, vehicle positioning, path planning, driver monitoring, and driver reminding. This improves driving safety, automation, and comfort of the vehicle.

In an example, the sensors that may be installed on the vehicle 100 include a photographing apparatus, a lidar, a millimeter-wave radar, an ultrasonic sensor, and the like.

The photographing apparatus is configured to obtain image information of an environment in which the vehicle is located. Currently, a plurality of cameras may be installed on the vehicle to obtain information of more angles.

The lidar is short for light detection and ranging (Lidar) system. The lidar mainly includes a transmitter, a receiver, and a signal processing unit. The transmitter is a light emitting mechanism in the lidar. After a light emitted by the transmitter is irradiated to a target object, the light is reflected by the target object, and the reflected light is converged to the receiver through a lens group. The signal processing unit is responsible for controlling transmission of the transmitter, processing a signal received by the receiver, and calculating information such as a position, a speed, a distance, and/or a size of the target object.

The millimeter-wave radar uses a millimeter wave as a detection medium, and can measure a distance, an angle, and a relative speed from the millimeter-wave radar to a measured object.

The ultrasonic sensor, also referred to as an ultrasonic radar, is a sensing apparatus that performs detection through an ultrasonic wave. An operation principle of the ultrasonic sensor is that an ultrasonic wave is emitted outward by using an ultrasonic wave emitting apparatus, an ultrasonic wave reflected by an obstacle is received by using a receiving apparatus, and a distance is calculated based on a time difference of the ultrasonic wave reflection and receiving. Currently, the distance calculated by the ultrasonic sensor may be used to indicate a distance between a vehicle body and the obstacle, so that parking is assisted or unnecessary collision is reduced.

It should be noted herein that a specific type of the vehicle is not limited in this application. For example, the vehicle may be a new energy vehicle, or may be a fuel vehicle, or the vehicle may not have a networking function, or may have a networking function.

For the vehicle 100 shown in FIG. 1, there are mainly two common manners of detecting a parking space and releasing parking space information to a driver on the market. In a first implementation, when the vehicle 100 travels at a speed lower than 24 kilometers per hour, the vehicle 100 starts to detect a parking space by using the installed sensors. When a parking space is detected, the vehicle 100 displays a prompt of the parking space by using an apparatus such as a central control screen, to recommend the parking space to the driver. In a second implementation, the vehicle 100 starts to detect a parking space only after an automatic parking function is enabled on the vehicle 100, and then a detected parking space is recommended to the driver.

However, it should be understood that in the first implementation, as long as the vehicle 100 detects a parking space when traveling at a speed lower than 24 kilometers per hour, continual prompts are provided by using the apparatus such as the central control screen. In this case, if the driver does not have a parking requirement, driving experience of the driver is greatly affected, and even a traffic accident is caused. In the second implementation, because the vehicle 100 starts to detect the parking space only after the automatic parking function is enabled on the vehicle, a parking space passed before the parking function is enabled cannot be detected, so that a probability that the user finds a parking space is reduced.

In view of this, an embodiment of this application provides a method for processing parking space information. In this method, when a vehicle is in a traveling process, an idle parking space around the vehicle is detected in real time, and information about the detected idle parking space is recorded. However, the information about the detected idle parking space is not output. When a driver sends a parking requirement, the information about the idle parking space is output, to recommend the information about the idle parking space to the driver.

It should be noted herein that this application may be applied to a scenario in which the vehicle 100 may need to be parked. For example, the scenario may be a scenario in which the vehicle 100 may need to be parked when arriving at an office place, a scenario in which the vehicle 100 may need to be parked when arriving at a residential apartment complex, or a scenario in which the vehicle 100 may need to be parked when arriving at a strange place. In addition, it should be further noted herein that a type of a parking space is not limited in embodiments of this application. For example, the parking space may be a parking space in an underground parking garage, a parking space in a ground parking garage, or a roadside parking space.

Figure 2:
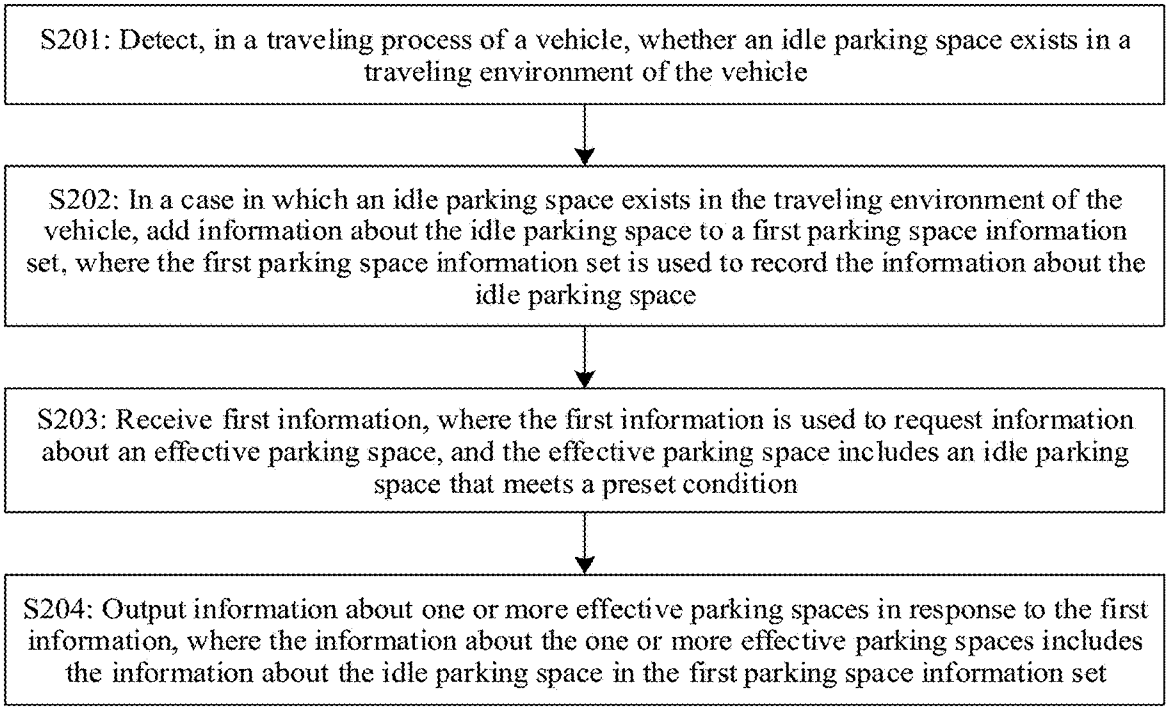
FIG. 2 is a schematic flowchart of a method for processing parking space information according to an embodiment of this application.

FIG. 2 shows a method for processing parking space information according to an embodiment of this application. The method may be performed by the vehicle shown in FIG. 1. As shown in FIG. 2, the method provided in this embodiment of this application includes S201, S202, S203, and S204. The following describes the steps in the method shown in FIG. 2 in detail.

S201: Detect, in a traveling process of a vehicle, whether an idle parking space exists in a traveling environment of the vehicle.

The idle parking space may be considered as a parking space without a parking vehicle. The traveling environment of the vehicle may be considered as an ambient environment of the vehicle in the traveling process.

Figure 3:
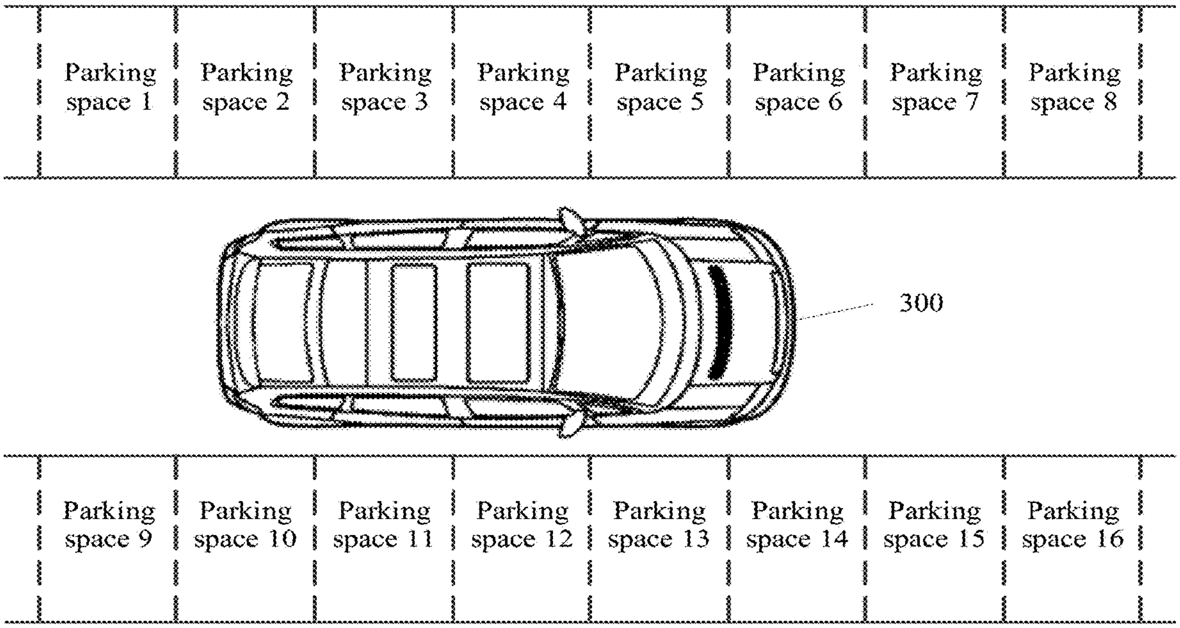
FIG. 3 is a schematic diagram of a structure in a vehicle traveling process according to an embodiment of this application.

For example, FIG. 3 is a schematic diagram of a structure in the vehicle traveling process. As shown in FIG. 3, in a current traveling environment of a vehicle 300, there are parking spaces (for example, a parking space 1 to a parking space 16 in FIG. 3) on both sides. It is assumed that there are vehicles parked in the parking space 1 to the parking space 8, the parking space 9, the parking space 13, the parking space 15, and the parking space 16. In other words, there is no vehicle in the parking space 10, the parking space 11, the parking space 12, and the parking space 14. In this case, it may be considered that there are idle parking spaces in the current traveling environment of the vehicle.

In this embodiment, whether an idle parking space exists in the traveling environment of the vehicle is detected in the traveling process of the vehicle. In other words, even if a driver does not send a parking request, it is detected whether an idle parking space exists in the traveling environment.

It should be noted herein that an implementation of detecting whether an idle parking space exists in the traveling environment of the vehicle is not limited in this embodiment of this application. For example, detection may be performed by using sensors on the vehicle.

S202: In a case in which an idle parking space exists in the traveling environment of the vehicle, add information about the idle parking space to a first parking space information set, where the first parking space information set is used to record the information about the idle parking space.

In this embodiment, after the idle parking space is detected, the information about the idle parking space is added to the first parking space information set. In other words, the information about the idle parking space is recorded.

For example, there is no vehicle in the parking space 10, the parking space 11, the parking space 12, and the parking space 14 described in S201. In other words, it is detected that the parking space 10, the parking space 11, the parking space 12, and the parking space 14 are idle parking spaces. In this case, information about the parking space 10, information about the parking space 11, information about the parking space 12, and information about the parking space 14 are all added to the first parking space information set.

In this embodiment, when the information about the idle parking space is added to the first parking space information set, the information about the idle parking space that may be added includes: (1) information detected directly: a geographical location of the idle parking space, a size of the idle parking space, and whether a charging pile is available in the idle parking space; and (2) information indirectly obtained by detecting a sign: a type of the idle parking space (including a public parking space, a dedicated parking space, and a private parking space), a parking time limit, whether to charge, a charging standard, and the like. It should be noted herein that the foregoing information about the idle parking space that may be added is merely an example, and does not constitute a limitation on this application. For example, more or less information about the idle parking space may be further added.

It should be noted herein that a specific form of the first parking space information set is not limited in this embodiment. For example, the first parking space information set may alternatively be hardware, such as a memory. The memory is configured to record the information about the idle parking space.

S203: Receive first information, where the first information is used to request information about an effective parking space, and the effective parking space includes an idle parking space that meets a preset condition.

It may be understood that, when the driver has a parking requirement, the driver sends, to the vehicle, information (that is, the first information) for requesting an effective parking space. In this embodiment, when the driver sends the information for requesting an effective parking space, the preset condition may be further included in the information for requesting an effective parking space. For example, the information may be information about an idle parking space within a 1-kilometer radius or information about an idle parking space within 5 minutes away from a current time.

Correspondingly, the vehicle receives the first information.

S204: Output information about one or more effective parking spaces in response to the first information, where the information about the one or more effective parking spaces includes the information about the idle parking space in the first parking space information set.

In other words, the vehicle outputs the information about the one or more effective parking spaces only when receiving the first information, to recommend the information to the driver. On the contrary, if the vehicle does not receive the first information, the vehicle does not output the information about the one or more effective parking spaces. Alternatively, it may be considered that the information about the one or more effective parking spaces is output after the first information is received.

It should be noted herein that a manner of outputting the information about the one or more effective parking spaces is not limited in this embodiment of this application. For example, the outputting may be performed in a voice form, or the outputting may be performed in a form of a central control screen interface.

According to the method for processing parking space information provided in this embodiment, the idle parking space in the traveling environment of the vehicle is started to be detected and the idle parking space is recorded before the driver sends the information for requesting an effective parking space. Therefore, after the driver sends the information for requesting an effective parking space, the information about the idle parking space that is recorded before the driver sends the information for requesting an effective parking space may also be recommended to the driver. This expands a range of searching for an idle parking space and improves a probability of finding an idle parking space. In addition, before the driver sends the information for requesting an effective parking space, the information about the idle parking space is not recommended to the driver in any manner. This avoids affecting driver's experience. In other words, the method for processing parking space information provided in this embodiment can not only improve a probability of effectively finding a parking space, but also improve driver's experience.

As an optional embodiment, the preset condition includes: a distance from a current location of the vehicle is less than or equal to a second preset distance.

In this embodiment, the effective parking space is an idle parking space whose distance from the current location of the vehicle is less than or equal to the second preset distance. For example, the effective parking space is an idle parking space whose distance from the current location of the vehicle is less than or equal to 3 kilometers.

In a possible implementation, the second preset distance may be information that is preset in the vehicle.

In another possible implementation, the second preset distance may be information entered by the driver. In this case, the method further includes: receiving fourth information, where the fourth information indicates the second preset distance.

It may be understood that the driver usually may need to stop suddenly. For example, in a driving process, the driver suddenly may need to stop on a roadside. In this case, an idle parking space usually may need to be found near the current location of the vehicle. In view of this, in this embodiment, when the driver sends a parking requirement, the output idle parking space is an idle parking space that meets the second preset distance that is set by the driver, to avoid outputting a meaningless idle parking space.

It should be noted herein that, in this application, a driving scenario in which the driver suddenly may need to stop is also referred to as a scenario of traveling without a destination.

Figure 4:
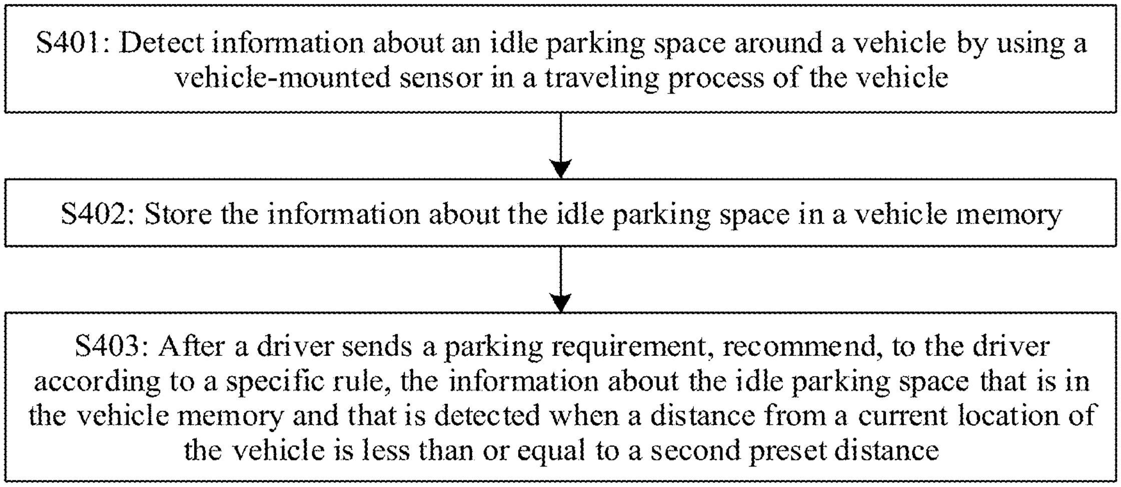
FIG. 4 is a schematic flowchart of a method for processing parking space information according to another embodiment of this application.

With reference to FIG. 4, the following describes in detail a method for processing parking space information existing in a case in which the vehicle is traveling without a destination.

As shown in FIG. 4, the method in this embodiment may include S401, S402, and S403.

S401: Detect information about an idle parking space around a vehicle by using a vehicle-mounted sensor in a traveling process of the vehicle.

For example, a camera may be configured to obtain a boundary line of an idle parking space, a parking information sign (such as a sign about whether the parking space is public, a parking time limit, or a charging standard), and whether a charging pile is available. A millimeter-wave radar and a lidar may be configured to detect an obstacle near the parking space.

S402: Store the information about the idle parking space in a vehicle memory.

In this step, for detailed descriptions about the information about the idle parking space, refer to the descriptions in the embodiment shown in FIG. 2. Details are not described herein again. For example, the information about the idle parking space includes: whether the parking space allows parking, a parking time limit, whether a charging pile is available, a charging standard, and a size of the parking space.

In this embodiment, the memory may be considered to be configured to record the information about the idle parking space.

S403: After the driver sends a parking requirement, recommend, to the driver according to a specific rule, the information about the idle parking space that is in the vehicle memory and that is detected when a distance from the current location of the vehicle is less than or equal to the second preset distance.

In this embodiment, the information about the idle parking space that is in the vehicle memory and that is detected when the distance from the current location of the vehicle is less than or equal to the second preset distance may be recommended to the driver according to a specific rule.

It should be noted herein that the specific rule is not limited in this embodiment. For example, three idle parking spaces may be recommended first from idle parking spaces closest to the current location of the vehicle or idle parking spaces closest to the destination, and then three idle parking spaces with the lowest price are recommended. Subsequently, three parking spaces with the largest parking space are selected from the idle parking spaces. Finally, an optimal idle parking space is selected from the selected idle parking spaces based on the distance, price, and size of the idle parking space, and is recommended to the driver.

Optionally, after the information about the effective parking space in the vehicle memory is recommended to the driver according to a specific rule, the driver may select a proper idle parking space from the recommended information about the idle parking space. For example, some drivers prefer a spacious parking space, and therefore the driver may select an idle parking space with the largest parking space from the recommended information about the idle parking space. Some drivers use a distance as a factor for selecting an idle parking space, and therefore the driver may select an idle parking space closest to the vehicle from the recommended information about the idle parking space.

Optionally, after the driver determines the idle parking space, the vehicle may be manually driven or automatically driven to the determined idle parking space, and then be parked to the determined idle parking space.

Further, the information about the idle parking space in the memory may be processed. For example, in an implementation, considering that the idle parking space has time validity, and may be occupied by another driver after a period of time, the existing information about the idle parking space is of little use for next parking. Therefore, the information about the idle parking space that is recorded in the current traveling process may be deleted. In another implementation, only information about an idle parking space within the latest 3 kilometers or information about an idle parking space within the latest 30 minutes is stored. It should be noted herein that the foregoing 3 kilometers or 30 minutes is merely an example, and does not constitute a limitation on this application. In still another implementation, processing is alternatively not performed temporarily. When a storage capacity is insufficient, earliest recorded information about the idle parking space is automatically cleared.

According to the method for processing parking space information provided in this embodiment, an output effective parking space is a parking space that meets the second preset distance that is set by the user. This avoids outputting a meaningless idle parking space.

As an optional embodiment, the preset condition includes: a time difference between a time at which the idle parking space is detected and a current time is less than or equal to preset duration.

In this embodiment, the effective parking space is an idle parking space detected during time duration in which a time difference from a current time is less than or equal to the preset duration. For example, the preset duration is 30 minutes.

In a possible implementation, the preset duration may be information that is preset in the vehicle.

In another possible implementation, the preset duration may be information entered by the driver. In this case, the method further includes: receiving fifth information, where the fifth information indicates the preset duration.

A unique difference between this embodiment and the embodiment shown in FIG. 4 lies in that: a condition that the effective parking space in this step meets is that a time difference between a time at which the idle parking space is detected and a current time is less than or equal to the preset duration. Other parts are the same as those in the embodiment shown in FIG. 4, and therefore details are not described herein again.

As an optional embodiment, the method further includes: receiving second information, where the second information indicates a destination of the vehicle; and correspondingly, the detecting, in a traveling process of a vehicle, whether an idle parking space exists in a traveling environment of the vehicle includes: in the traveling process of the vehicle, after a distance between a location of the vehicle and the destination is less than or equal to a first preset distance, starting to detect whether an idle parking space exists in the traveling environment of the vehicle.

In this embodiment, the information about the detected idle parking space is information about an idle parking space that meets the first preset distance, set by the driver, from the destination. For example, the first preset distance is 3 kilometers.

In a possible implementation, the first preset distance may be information that is preset in the vehicle.

In another possible implementation, the first preset distance may be information entered by the driver. In this case, the method further includes: receiving third information, where the third information indicates the first preset distance.

It may be understood that the driver usually has a requirement for driving the vehicle to a destination. For example, the destination is an apartment complex in which the driver lives, an office place of the driver, or the like. In this case, the driver may need to park the vehicle in an idle parking space near the destination. In view of this, a difference between this embodiment and the embodiment shown in FIG. 2 lies in that: an idle parking space is started to be detected only after the distance between the location of the vehicle and the destination is less than or equal to the first preset distance. For example, an idle parking space is started to be detected only after the distance between the location of the vehicle and the destination is less than or equal to 3 kilometers.

It should be noted herein that, in this application, driving a vehicle to a destination is also referred to as traveling with a destination.

It may be understood that an idle parking space is started to be detected only after the distance between the location of the vehicle and the destination is less than or equal to the first preset distance. In other words, an idle parking space is not detected when the distance between the location of the vehicle and the destination is greater than the first preset distance. This reduces energy consumption of the vehicle.

Figure 5:
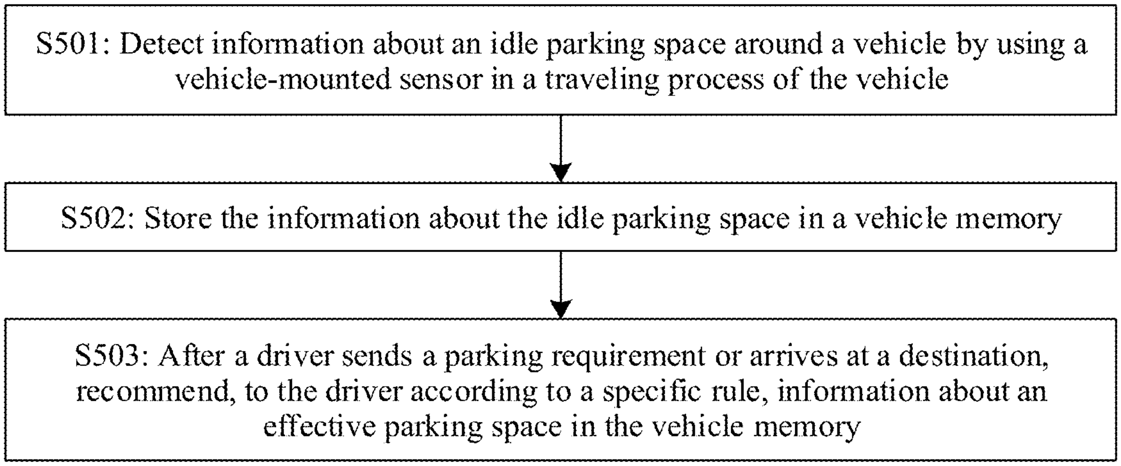
FIG. 5 is a schematic flowchart of a method for processing parking space information according to another embodiment of this application.

With reference to FIG. 5, the following describes in detail a method for processing parking space information existing in a case in which the vehicle is traveling with a destination.

As shown in FIG. 5, the method in this embodiment may include S501, S502, and S503.

S501: Detect an idle parking space around a vehicle by using a vehicle-mounted sensor in a traveling process of the vehicle.

In this embodiment, to reduce energy consumption of the vehicle, detection may be started to be performed after a distance between a location of the vehicle and a destination is less than or equal to a first preset distance. For example, the first preset distance is 3 kilometers. Therefore, detection may be started to be performed after the distance between the location of the vehicle and the destination is less than or equal to 3 kilometers.

S502: Store information about the idle parking space in a vehicle memory.

In this step, for detailed descriptions about the information about the idle parking space, refer to the descriptions in the embodiment shown in FIG. 2. Details are not described herein again. For example, the information about the idle parking space includes: whether the parking space allows parking, a parking time limit, whether a charging pile is available, a charging standard, and a size of the parking space.

In this embodiment, the memory may be considered to be configured to record the information about the idle parking space.

It may be understood that, in this embodiment, the information about the idle parking space stored in the vehicle memory is information about an idle parking space whose distance from the destination is less than or equal to the first preset distance.

S503: After the driver sends a parking requirement or arrives at the destination, recommend, to the driver according to a specific rule, the information about the effective parking space in the vehicle memory.

The effective parking space is an idle parking space that meets a preset condition. In this embodiment, the information about the idle parking space stored in the memory is information about an idle parking space whose distance from the destination is less than or equal to the first preset distance. Therefore, the effective parking space in this embodiment is the information about the idle parking space stored in the memory.

It should be noted herein that when the information about the effective parking space in the vehicle memory is recommended to the driver according to a specific rule, the specific rule is not limited in this embodiment. For descriptions of the specific rule, refer to the descriptions of S403 in the embodiment shown in FIG. 4.

Optionally, after the information about the effective parking space in the vehicle memory is recommended to the driver according to a specific rule, the driver may select a proper idle parking space from the recommended information about the idle parking space. After the driver determines the idle parking space, the vehicle may be manually driven or automatically driven to the determined idle parking space, and then be parked to the determined idle parking space. Further, the information about the idle parking space in the memory may be processed. For detailed descriptions of this part, refer to the descriptions of S403 in the embodiment shown in FIG. 4. Details are not described herein again.

According to the method for processing parking space information provided in this embodiment, the detected information about the idle parking space is an idle parking space that meets the first preset distance that is set by the driver. This avoids detection performed on a redundant idle parking space, so that resource consumption of the vehicle is avoided.

As an optional embodiment, outputting information about one or more effective parking spaces in response to the first information includes: obtaining a second parking space information set through a network in response to the first information, where the second parking space information set is used to record the information about the idle parking space; obtaining the information about the one or more effective parking spaces from the first parking space information set and the second parking space information set; and outputting the information about the one or more effective parking spaces.

It may be understood that, if only the first parking space information set is used, missing detection or a detection error may occur due to inaccurate vehicle detection. Therefore, a difference between this embodiment and the embodiments shown in FIG. 2 to FIG. 5 lies in that: when a parking request of a driver is received (that is, the first information is received) and the parking request of the driver is responded to, the information about the one or more effective parking spaces from the first parking space information set and the second parking space information set is obtained. The second information set may be considered as obtaining the stored information about the idle parking space through the network. For example, some information about the idle parking space stored in the cloud may be obtained through the network.

According to the method for processing parking space information provided in this embodiment, the information about the one or more effective parking spaces is output from two parking space information sets. Therefore, compared with that the information about the one or more effective parking spaces is output through a single parking space information set, the information about the one or more effective parking spaces obtained in this implementation is more robust.

The following describes, with reference to two specific embodiments, a method for outputting information about one or more effective parking spaces through the first parking space information set and the second parking space information set. The first embodiment describes a scenario of traveling without a destination, and the second embodiment describes a scenario of traveling with a destination.

In the first embodiment, step 1 to step 3 are included.

Step 1: Detect information about an idle parking space around a vehicle by using a vehicle-mounted sensor in a traveling process of the vehicle.

For detailed descriptions of this step, refer to the descriptions of S401 in the foregoing embodiments.

Step 2: Store the information about the idle parking space in a vehicle memory.

For detailed descriptions of this step, refer to the descriptions of S402 in the foregoing embodiments.

Step 3: After the driver sends the request, recommend, to the driver according to a specific rule, the information about the effective parking space in the vehicle memory and the information about the effective parking space in the second parking information set obtained through the network.

It should be noted herein that, a difference between this embodiment and the embodiments in FIG. 2 to FIG. 5 lies in that: in this embodiment, the effective parking space recommended to the driver is obtained from two parts. One part is the information about the effective parking space in the vehicle memory, and the other part is obtained from the second parking information set obtained through the network.

In this step, the information about the effective parking space in the vehicle memory may be information about an idle parking space detected when the distance from the current location of the vehicle is less than or equal to the second preset distance in the traveling process of the vehicle. For detailed descriptions of this part, refer to the descriptions of related parts in the foregoing embodiments. Alternatively, the information about the effective parking space in the vehicle memory may be information about an idle parking space detected when a time difference from the current time of the vehicle is less than or equal to the preset duration. For detailed descriptions of this part, refer to the descriptions of related parts in the foregoing embodiments.

Optionally, after the information about the effective parking space in the vehicle memory is recommended to the driver according to a specific rule, the driver may select a proper idle parking space from the recommended information about the idle parking space. After the driver determines the idle parking space, the vehicle may be manually driven or automatically driven to the determined idle parking space, and then be parked to the determined idle parking space. Further, the information about the idle parking space in the memory may be processed. For detailed descriptions of this part, refer to the related parts in the embodiment shown in FIG. 4. Details are not described herein again.

In the second embodiment, step 1 to step 3 are included.

Step 1: Detect information about an idle parking space around a vehicle by using a vehicle-mounted sensor in a traveling process of the vehicle.

In this embodiment, to reduce energy consumption of the vehicle, the information about the idle parking space around the vehicle starts to be detected after the distance between the location of the vehicle and the destination is less than or equal to the first preset distance. For detailed descriptions of this step, refer to the descriptions of S501 in the embodiment shown in FIG. 5.

Step 2: Store the information about the idle parking space in a vehicle memory.

For detailed descriptions of this step, refer to the descriptions of S502 in the foregoing embodiments.

Step 3: After the driver sends a parking requirement or arrives at the destination, recommend, to the driver according to a specific rule, the information about the effective parking space in the vehicle memory and the information about the effective parking space in the second parking information set obtained through the network.

It may be understood that, in this step, the information about the effective parking space in the vehicle memory is information about an idle parking space detected after the distance between the location of the vehicle and the destination is less than or equal to the first preset distance.

Optionally, after the information about the effective parking space in the vehicle memory is recommended to the driver according to a specific rule, the driver may select a proper idle parking space from the recommended information about the idle parking space. After the driver determines the idle parking space, the vehicle may be manually driven or automatically driven to the determined idle parking space, and then be parked to the determined idle parking space. Further, the information about the idle parking space in the memory may be processed. For detailed descriptions of this part, refer to the related parts in the embodiment shown in FIG. 5. Details are not described herein again.

It should be noted herein that although the foregoing embodiments are used to recommend an idle parking space, the method in this application is not limited. For example, the foregoing embodiments may be further used to recommend a charging pile. In addition, it is further noted herein that the method in this embodiment may be further applied to another device with a sensing function, to implement sensing, storage, and recommendation functions, for example, a robot automatically searches for a charging socket.

Figure 6:
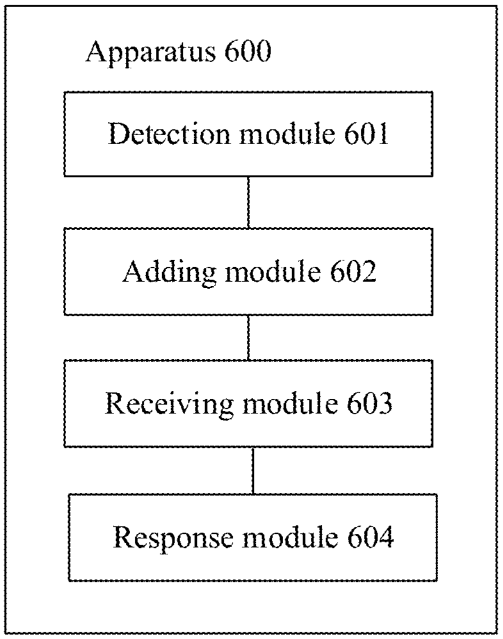
FIG. 6 is a schematic diagram of a structure of an apparatus for processing parking space information according to an embodiment of this application.

FIG. 6 is a schematic diagram of a structure of an apparatus for processing parking space information according to an embodiment of this application. An apparatus 600 includes: a detection module 601 configured to detect, in a traveling process of a vehicle, whether an idle parking space exists in a traveling environment of the vehicle; an adding module 602 configured to: in a case in which an idle parking space exists in the traveling environment of the vehicle, add information about the idle parking space to a first parking space information set, where the first parking space information set is used to record the information about the idle parking space; a receiving module 603 configured to receive first information, where the first information is used to request information about an effective parking space, and the effective parking space includes an idle parking space that meets a preset condition; and a response module 604 configured to output information about one or more effective parking spaces in response to the first information, where the information about the one or more effective parking spaces includes the information about the idle parking space in the first parking space information set.

In a possible implementation, the receiving module 603 is further configured to: receive second information, where the second information indicates a destination of the vehicle; and correspondingly, the detection module 601 is specifically configured to: in the traveling process of the vehicle, after a distance between a location of the vehicle and the destination is less than or equal to a first preset distance, start to detect whether an idle parking space exists in the traveling environment of the vehicle.

In a possible implementation, the receiving module 603 is further configured to: receive third information, where the third information indicates the first preset distance.

In a possible implementation, the preset condition includes: a distance from a current location of the vehicle is less than or equal to a second preset distance.

In a possible implementation, the receiving module 603 is further configured to: receive fourth information, where the fourth information indicates the second preset distance.

In a possible implementation, the preset condition includes: a time difference between a time at which the idle parking space is detected and a current time is less than or equal to preset duration.

In a possible implementation, the receiving module is further configured to: receive fifth information, where the fifth information indicates the preset duration.

In a possible implementation, the response module 604 is specifically configured to: obtain a second parking space information set through a network in response to the first information, where the second parking space information set is used to record the information about the idle parking space; obtain the information about the one or more effective parking spaces from the first parking space information set and the second parking space information set; and output the information about the one or more effective parking spaces.

Figure 7:
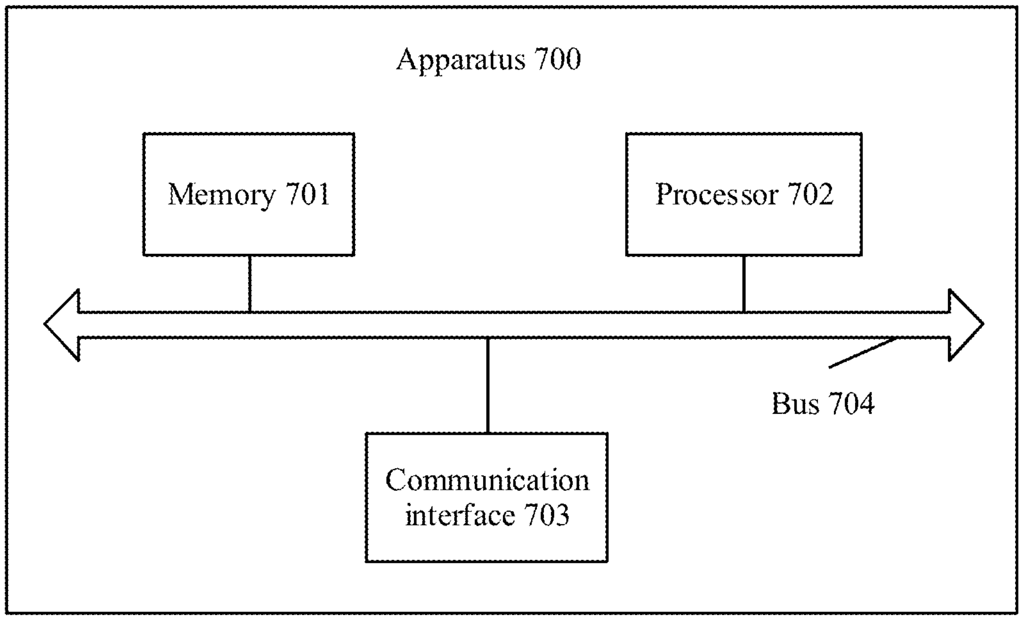
FIG. 7 is a schematic diagram of a structure of an apparatus for processing parking space information according to another embodiment of this application.

FIG. 7 is a schematic diagram of a structure of a time synchronization apparatus according to another embodiment of this application. The apparatus shown in FIG. 7 may be configured to perform the method according to any one of the foregoing embodiments.

As shown in FIG. 7, an apparatus 700 in this embodiment includes: a memory 701, a processor 702, a communication interface 703, and a bus 704. The memory 701, the processor 702, and the communication interface 703 are communicatively connected to each other through the bus 704.

The memory 701 may be a read-only memory (ROM), a static storage device, a dynamic storage device, or a random-access memory (RAM). The memory 701 may store a program. When the program stored in the memory 701 is executed by the processor 702, the processor 702 is configured to perform steps of the methods shown in FIG. 2 to FIG. 5.

The processor 702 may be a general-purpose central processing unit (CPU), a microprocessor, an application-specific integrated circuit (ASIC), or one or more integrated circuits configured to execute a related program, to implement the methods shown in FIG. 2 to FIG. 5 of this application.

The processor 702 may alternatively be an integrated circuit chip and has a signal processing capability. In an implementation process, steps of the methods in FIG. 2 to FIG. 5 in embodiments of this application may be completed by using an integrated logic circuit of hardware in the processor 702 or by using instructions in a form of software.

The processor 702 may alternatively be a general-purpose processor, a digital signal processor (DSP), an ASIC, a field-programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be another processor, or the like.

The steps in the methods disclosed with reference to embodiments of this application may be directly performed and completed by a hardware decoding processor, or may be performed and completed by a combination of hardware and a software module in the decoding processor. The software module may be located in a mature storage medium in the art such as a random access memory, a flash memory, a read-only memory, a programmable read-only memory, an electrically erasable programmable memory, or a register.

The storage medium is located in the memory 701. The processor 702 reads information in the memory 701, and completes, in combination with hardware of the processor 702, functions that may need to be performed by the units included in the apparatus in this application. For example, the processor 702 may perform steps/functions in embodiments shown in FIG. 2 to FIG. 5.

The communication interface 703 may use, but is not limited to, a transceiver apparatus such as a transceiver, to implement communication between the apparatus 700 and another device or a communication network.

The bus 704 may include a path for transmitting information between components (for example, the memory 701, the processor 702, and the communication interface 703) of the apparatus 700.

It should be understood that the apparatus 700 shown in embodiments of this application may be an electronic device, or may be a chip configured in an electronic device.

All or some of the foregoing embodiments may be implemented using software, hardware, firmware, or any combination thereof. When software is used to implement embodiments, the foregoing embodiments may be all or partially implemented in a form of a computer program product. The computer program product includes one or more computer instructions or computer programs. When the program instructions or the computer programs are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, infrared, radio, and microwave, or the like) manner. The computer-readable storage medium may be any usable medium that can be accessed by the computer, or a data storage device, for example, a server or a data center in which one or more usable media are integrated. The usable medium may be a magnetic medium (for example, a floppy disk, a hard disk, or a magnetic tape), an optical medium (for example, a digital video disc (DVD)), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, "at least one" means one or more, and "a plurality of" means two or more. "At least one of the following items" or a similar expression thereof means any combination of these items, including a singular item or any combination of plural items. For example, at least one of a, b, or c may indicate: a, b, c, a-b, a-c, b-c, or a-b-c, where a, b, and c may be singular or plural.

It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units, and algorithm steps may be implemented by electronic hardware or a combination of computer software and electronic hardware. Whether the functions are performed by hardware or software depends on particular applications and design constraints of the technical solutions. A skilled person may use different methods for particular applications to implement the described functions, but this implementation should not be considered as beyond the scope of this application.

A person skilled in the art may clearly understand that, for the purpose of convenient and brief description, for a detailed operation process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the function is implemented in a form of a software functional unit and sold or used as an independent product, the function may be stored in a computer-readable storage medium. Based on such an understanding, the technical solutions in this application or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a universal serial bus (USB) flash drive, a removable hard disk, a read-only memory, a RAM, a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:

detecting, in a traveling process of a vehicle, whether an idle parking space exists in a traveling environment of the vehicle;

adding, when the idle parking space exists in the traveling environment, idle parking space information about the idle parking space to a first parking space information set, wherein the first parking space information set records the idle parking space information;

receiving first information, wherein the first information requests information about one or more effective parking spaces, and wherein the one or more effective parking spaces comprises one or more idle parking spaces that meets a preset condition, wherein the preset condition comprises a time difference between a time at which the idle parking space is detected and a current time being less than or equal to a preset duration; and outputting effective parking space information about the one or more effective parking spaces in response to the first information, wherein the effective parking space information comprises the idle parking space information in the first parking space information set.

2. The method of claim 1, further comprising receiving second information, wherein the second information indicates a destination of the vehicle, and wherein detecting whether the idle parking space exists in the traveling environment comprises starting, in the traveling process and after a distance between a location of the vehicle and the destination is less than or equal to a first preset distance, to detect whether the idle parking space exists in the traveling environment.

3. The method of claim 2, further comprising receiving third information, wherein the third information indicates the first preset distance.

4. The method of claim 1, further comprising receiving fourth information, wherein the fourth information indicates the preset duration.

5. The method of claim 1, wherein outputting the effective parking space information in response to the first information comprises:

obtaining a second parking space information set through a network in response to the first information, wherein the second parking space information set records the idle parking space information;

obtaining the effective parking space information from the first parking space information set and the second parking space information set; and outputting the effective parking space information.

6. The method of claim 1, further comprising:

storing the effective parking space information about the one or more effective parking spaces within the preset duration; and deleting the effective parking space information after the preset duration is exceeded.

7. An apparatus comprising:

a detection module configured to detect, in a traveling process of a vehicle, whether an idle parking space exists in a traveling environment of the vehicle;

a receiving module configured to receive first information, wherein the first information requests information about one or more effective parking spaces, and wherein the one or more effective parking spaces comprises one or more idle parking spaces that meets a preset condition, wherein the preset condition comprises a time difference between a time at which the idle parking space is detected and a current time being less than or equal to a preset duration; and a processor coupled to the detection module and the receiving module, wherein the processor is configured to:

add, when the idle parking space exists in the traveling environment, idle parking space information about the idle parking space to a first parking space information set, wherein the first parking space information set records the idle parking space information; and output effective parking space information about the one or more effective parking spaces in response to the first information, wherein the effective parking space information comprises the idle parking space information in the first parking space information set.

8. The apparatus of claim 7, wherein the receiving module is further configured to receive second information, wherein the second information indicates a destination of the vehicle, and wherein the detection module is further configured to start, in the traveling process and after a distance between a location of the vehicle and the destination is less than or equal to a first preset distance, to detect whether the idle parking space exists in the traveling environment.

9. The apparatus of claim 8, wherein the receiving module is further configured to receive third information, wherein the third information indicates the first preset distance.

10. The apparatus of claim 7, wherein the receiving module is further configured to receive fourth information, wherein the fourth information indicates the preset duration.

11. The apparatus of claim 7, wherein the processor is further configured to:

obtain a second parking space information set through a network in response to the first information, wherein the second parking space information set records the idle parking space information;

obtain the effective parking space information from the first parking space information set and the second parking space information set; and output the effective parking space information.

12. The apparatus of claim 7, wherein the processor is further configured to:

store the effective parking space information about the one or more effective parking spaces within the preset duration; and delete the effective parking space information after the preset duration is exceeded.

13. A non-transitory computer-readable medium having stored therein computer program product comprising instructions that, when executed by a processor, cause an apparatus to:

detect, in a traveling process of a vehicle, whether an idle parking space exists in a traveling environment of the vehicle;

add, when the idle parking space exists in the traveling environment, idle parking space information about the idle parking space to a first parking space information set, wherein the first parking space information set records the idle parking space information;

receive first information, wherein the first information requests information about one or more effective parking spaces, and wherein the one or more effective parking spaces comprises one or more idle parking spaces that meets a preset condition, wherein the preset condition comprises a time difference between a time at which the idle parking space is detected and a current time being less than or equal to a preset duration; and output effective parking space information about the one or more effective parking spaces in response to the first information, wherein the effective parking space information comprises the idle parking space information in the first parking space information set.

14. The non-transitory computer-readable medium of claim 13, wherein the instructions, when executed by the processor, further cause the apparatus to receive second information, wherein the second information indicates a destination of the vehicle, and wherein detecting whether the idle parking space exists in the traveling environment comprises starting, in the traveling process and after a distance between a location of the vehicle and the destination is less than or equal to a first preset distance, to detect whether the idle parking space exists in the traveling environment.

15. The non-transitory computer-readable medium of claim 14, wherein the instructions, when executed by the processor, further cause the apparatus to receive third information, wherein the third information indicates the first preset distance.

16. The non-transitory computer-readable medium of claim 13, wherein the instructions, when executed by the processor, further cause the apparatus to receive fourth information indicating the preset duration.

17. The non-transitory computer-readable medium of claim 13, wherein the instructions, when executed by the processor, further cause the apparatus to further output the effective parking space information in response to the first information by:

obtaining a second parking space information set through a network in response to the first information, wherein the second parking space information set records the idle parking space information;

obtaining the effective parking space information from the first parking space information set and the second parking space information set; and outputting the effective parking space information.

18. The non-transitory computer-readable medium of claim 13, wherein the instructions, when executed by the processor, further cause the apparatus to:

store the effective parking space information about the one or more effective parking spaces within the preset duration; and delete the effective parking space information after the preset duration is exceeded.

* * * * *